United States Patent
Cawley (10) Patent No.: US 9,489,182 B1
(45) Date of Patent: Nov. 8, 2016

(54) TRANSPARENT PROCESS INTERCEPTION

(71) Applicant: SEMMLE LIMITED, Oxford (GB)

(72) Inventor: Peter Cawley, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 14/947,631

(22) Filed: Nov. 20, 2015

(51) Int. Cl.
*G06F 9/44* (2006.01)
*G06F 9/45* (2006.01)
*G06F 9/455* (2006.01)

(52) U.S. Cl.
CPC ........... *G06F 8/443* (2013.01); *G06F 9/45504* (2013.01)

(58) Field of Classification Search
CPC ....... G06F 8/443; G06F 8/4441; G06F 8/441
USPC ........................................................ 717/152
See application file for complete search history.

(56) References Cited

U.S. PATENT DOCUMENTS

| 2014/0282450 A1* | 9/2014 | Jubran | G06F 8/443 717/151 |
| 2015/0347163 A1* | 12/2015 | Tibble | G06F 8/54 717/152 |

OTHER PUBLICATIONS

"The Invocation API", retrieved at http://docs.oracle.com/javase/7/docs/technotes/guides/jni/spec/invocation.html on Jun. 17, 2016, 6 pages.

"Package java.lang.instrument", retrieved at http://docs.oracle.com/javase/7/docs/api/java/lang/instrument/package-summary.html on Jun. 17, 2016, 5 page.

IBM Knowledge Center, "Example: Java Invocation API", retrieved at https://www.ibm.com/support/knowledgecenter/ssw_i5_54/rzaha/invapiex.html on Jun. 17, 2016, 3 pages.

Oracle Technology Network, "Troubleshooting Guide for Java SE 6 with HotSpot VM", retrieved at http://www.oracle.com/technetwork/java/javase/envvars-138887.html on Jun. 17, 2016, 2 pages.

Inonit.com, "Creating a JVM from a C Program", retrieved at http://www.inonit.com/cygwin/jni/invocationApi/c.html on Jun. 17, 2016, 2 pages.

IBM Knowledge Center, "Interface JavaVMInitArgs", retrieved at https://www.ibm.com/support/knowledgecenter/SSYKE2_8.0.0/com.ibm.java.api.80.doc/com.ibm.dtfj/com/ibm/dtfj/java/JavaVMInitArgs.html on Jun. 17, 2016, 3 pages.

* cited by examiner

*Primary Examiner* — John Chavis
(74) *Attorney, Agent, or Firm* — Fish & Richardson P.C.

(57) ABSTRACT

Methods, systems, and apparatus, including computer programs encoded on computer storage media, for transparently instrumenting a build system. One of the methods includes setting, in an execution environment of a computer system, a first environment variable that specifies a custom agent to be executed in the execution environment. A request by the system to create a virtual machine using a default create VM function is intercepted by a custom create VM function. The custom create VM function removes the first environment variable from the execution environment, and the custom create VM function executes the default create VM function to invoke a VM having the custom agent without the execution environment having the first environment variable being set.

30 Claims, 3 Drawing Sheets

TRANSPARENT PROCESS INTERCEPTION

BACKGROUND

This specification relates to transparent build system instrumentation, which can be used for static analysis of computer software source code.

Static analysis refers to techniques for analyzing computer software source code without executing the source code as a computer software program.

Source code in a code base is typically compiled in a build environment that includes a build system. The build environment includes an operating system; a file system; executable files, e.g., compilers; environment variables, e.g., variables that indicate a path to file system directories that contain executable files; and other configuration files for building source code in the code base.

Many build systems can make arbitrary textual substitutions in existing source code files before a compiler is called to compile the modified source code. Build systems can also generate temporary source code files that are compiled but then deleted by the build system when compilation is complete.

In addition, build utilities, e.g., the "ant" utility on the Linux and Unix operating systems, can be programmed to copy source code files from one place to another during the build process. For example, a build utility can copy a file from one location to another for compilation because another source code file may include or depend on the copied file. The copied file may then be deleted by the build system after compilation is complete.

In these situations, merely having read access to the source code files in a file system is insufficient for a static analysis system to extract all the source code that is built by a build system.

SUMMARY

To extract the source code that is built by a build system, a static analysis system can instrument a build system using a custom agent, which, in some build systems, is a class that is loaded at run-time that is used to redefine the contents of another class. Thus, when the build system calls default compile functions are called, the custom agent is invoked instead, which the static analysis system can use to extract source code compiled by the build system. This specification describes how a static analysis system can transparently instrument a build system that uses custom agents, e.g., by intercepting calls to default symbol lookup and create VM functions of the build system. These calls can be replaced by custom functions that can modify the build environment to avoid triggering errors or diagnostic messages that would otherwise cause the build to fail.

The foregoing and other embodiments can each optionally include one or more of the following features, alone or in combination. In particular, one embodiment may include all the following features in combination.

Particular embodiments of the subject matter described in this specification can be implemented so as to realize one or more of the following advantages. When building code, a static analysis system can execute custom functions to transparently instrument a build system. The static analysis system can provide a custom create VM function that cleanses a build environment in order to avoid triggering build system errors that would otherwise cause the build to fail. The static analysis system can also provide a custom symbol lookup function that ensures proper operation of a default symbol lookup function by manipulating the function call stack. The custom create VM function can also restore the build environment to its original state after instrumentation has occurred. Restoring the build environment provides robustness in the instrumentation by allowing the custom agent to still be loaded in situations where the interception mechanisms for custom symbol lookup or create VM functions fail.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a static analysis system that can transparently instrument a build system in order to extract source code compiled by the build system without the build failing. Transparently instrumenting a build process means that a static analysis system intercepts calls to particular build system functions in a way that does not disrupt the build process.

For many build systems, any error message, diagnostic message, or compiler warning generated by a build process is considered to be a failure condition, and the build aborts. For example, in some build systems a compiler writing to stderr is interpreted as a build error on the part of the build system. If the process interception mechanism is not transparent, for example if the instrumented build writes to stderr and the non-instrumented build does not, performing source code extraction can cause the build process to fail, and the static analysis system will be unable to extract all source code compiled by the build system.

Figure 1:
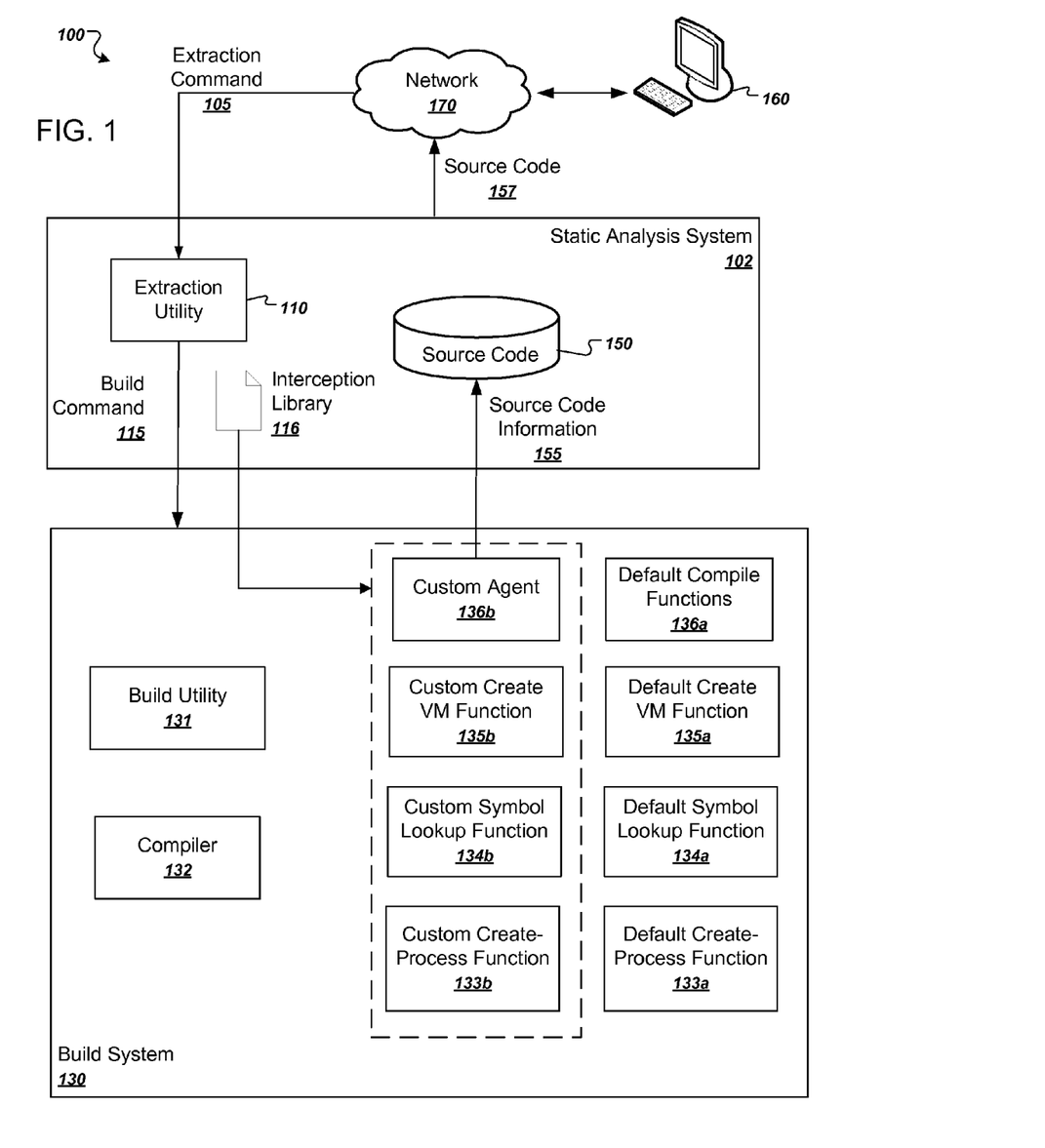
FIG. 1 illustrates an example system.

FIG. 1 illustrates an example system. The system 100 includes a user device 160 in communication with a static analysis system 102 over a network, 170, which can be any appropriate communications network. The components of the static analysis system 102 can be implemented as computer programs installed on one or more computers in one or more locations that are coupled to each through a network. Alternatively, the static analysis system 102 can be installed in whole or in part on a single computing device, e.g., the user device 160.

The static analysis system 102 is in communication with a build system 130. The static analysis system 102 and the build system 130 can be installed on different computing devices that are in communication with one another, e.g., using the network 170, or the static analysis system 102 and the build system 130 can be installed on a same computing device.

The build system 130 generally builds source code in a code base. The build system 130 includes a build utility 131 and a compiler 132. For example, the build utility 132 can be the "ant" utility, for Linux and Unix systems, or the build utility 132 can be a batch script that coordinates compiling of source code in the code base 140. The compiler 132 can be the conventional javac compiler for Java.

The build system 130 also includes a number of default components 133a, 134a, 135a, and 136a, which can be conventional components for launching new processes and compiling source code in the build system 130.

The static analysis system 102 provides an interception library 116 to the build system 130. The interception library 116 includes custom components that respectively preempt the default components of the build system 130. In this context, "preempting" means that whenever the build system 130 makes a request to invoke one of the default components, the request is intercepted by a corresponding custom component provided by the static analysis system 102. The custom components need not all be stored in the same library, but rather can be supplied by the static analysis system 102 as any appropriate module. The static analysis system can use a variety of techniques to get processes of the build system 130 to load the interception library 116. For example, on Linux systems, the extraction utility 110 can set the LD_PRELOAD environment variable, which will cause new processes to load the interception library 116.

A first example custom component is a custom create-process function 133b that preempts a default create-process function 133a. Thus, whenever the build system 130 calls the default-create process function 133a to generate a new process, the build system 130 will actually call the custom create-process function 133b. The custom create-process function 133b ensures that each new process called by the build system 130 will also load the interception library 116. For example, on Linux systems, the custom create-process function 133b can ensure that LD_PRELOAD is set appropriately.

A second example custom component is a custom symbol lookup function 134b that preempts a default symbol lookup function 134a. A symbol lookup function takes the name of a function and returns the address in memory of the named function, or an error if the function is not found. A symbol lookup function may also take as an argument a particular library in which the symbol is defined. For example, if the build system 130 runs Linux, the custom symbol lookup function 134b can preempt the function dlsym. If the build system runs Windows, the custom symbol lookup function 134b can preempt the function GetProcAddress. The custom symbol lookup function 134b returns the custom create virtual machine (VM) function 135b when it is requested. If any other symbol is requested, the custom symbol lookup function 134b uses the default symbol lookup function 134a to locate it.

A third example custom component is a custom create virtual machine function 135b that preempts a default create VM function 135a. The default create VM function 135a is used to initialize a virtual machine. In some build systems, VMs are used to host compiler processes for building source code. In some situations, the default create VM function 135a generates error messages if particular environment variables are set, which, as mentioned above, can cause a build to fail. Thus, the custom create VM function 135b can preempt calls to the default create VM function 135a in order to cleanse the build environment before calling the default create VM function 135a. For example, the default create VM function 135a can be JNI_CreateJavaVM, which is called to initialize a virtual machine to host the javac compiler.

To compile source code, the javac compiler makes use of default compile functions 136a. However, the default compile functions 136a are preempted by a custom agent 136b. In some implementations, a custom agent is a class loaded at run-time that is used to redefine the contents of another class. In particular, the custom agent can redefine the contents of a class to intercept calls to the default compile functions 136a. Thus, when the javac compiler calls a default compile function 136a to compile source code, the call is intercepted by the custom agent 136b, which provides source code information 155 back to the static analysis system 102. For example, the static analysis system 102 can use the source code information 155 to access the source code that is compiled by the build system and to store the source code in a collection of source code 150.

In operation, a user of the user device 160 can provide an extraction command 105 to the extraction utility 110 of the static analysis system 102. The extraction command 105 is a request to extract precisely the source code that the build system 130 compiles.

The extraction utility 110 provides a build command 115 to the build system 130. The build command 115 causes the build system 130 to execute the build utility 131.

The request to execute the build utility causes the build system 130 to invoke a new process using the default create-process function 133a to run the build utility 131. The request by the build system 130 to the default create-process function 133a is intercepted by the custom create-process function 133b. The custom create-process function 133b ensures that the interception library will be loaded by the new process, e.g., by setting LD_PRELOAD, and then calls the default create-process function 133a to run the build utility 131. Additional techniques for preempting create-process functions are described in commonly-owned U.S. patent application Ser. No. 14/292,691, for "Extracting Source Code," which is incorporated here by reference.

The build utility 131 will build source code in the build system 130 including repeatedly invoking the compiler 132 in a new process. On each new process that is invoked, the custom create-process function 133b will intercept the request and ensure that the interception library 116 is loaded by each new process.

Each compilation is hosted in a VM. To launch a VM to host the compilations, the new process will call the default symbol lookup function 134a to locate the default create VM function 135a. The call to the default symbol lookup function 134a will be preempted by the custom symbol lookup function 134b.

The custom symbol lookup function 134b returns an address of or a definition of the custom create VM function 135b whenever the default create VM function 135a is requested. If any other symbol was requested, the custom symbol lookup function 134b jumps to the default symbol lookup function 134a to find it, rather than directly calling the default symbol lookup function 134a. This is because the default symbol lookup function 134a often searches for the requested symbol in the next shared object in the library search order after the current library. In other words, the search begins with an object after the object that contains the currently executing call to the default symbol lookup function 134a. The object that contains the currently executing call to the default symbol lookup function is determined in the default symbol lookup function by examining the call stack to obtain the address of the calling function. By jumping to the default symbol lookup function 134a, the custom symbol lookup function 134b ensures that the address of the custom symbol lookup function 134b is not pushed onto the function call stack, which could make the default symbol lookup function return the wrong value.

The custom create VM function 135b uses the default create VM function to create a VM with a custom agent 136b. The custom agent 136b then intercepts calls to the default compile functions 136a to obtain the source code information 155, which the custom agent 136b passes back to the static analysis system 102. The static analysis system 102 can then access the source code and store the source code in a collection of source code 150 or pass the source code itself 157 back to the user device 160.

The custom create VM function 135b first cleanses the environment of environment variables that can cause a build to fail. One example environment variable that can cause a build to fail in some Java build environments is JAVA_TOOL_OPTIONS, which is an environment variable that can be used to specify the custom agent 136b. However, some default create VM functions emit a warning when the JAVA_TOOL_OPTIONS environment variable is set, a warning that the build system 130 may interpret as a failure condition.

Thus, when the custom agent 136b is specified by JAVA_TOOL_OPTIONS, the custom create VM function 135b can remove JAVA_TOOL_OPTIONS from the environment and can specify the custom agent 136b in other ways. For example, the custom create VM function 135b can specify the custom agent 136b as an argument to the default create VM function 135a, which typically does not cause the build to fail. Alternatively or in addition, the custom create VM function 135a or some other custom component can attach the custom agent 136b after the VM is started.

When the custom agent 136b has finished extracting the source code, the custom agent 135b can call the default compile functions 136a so that the build proceeds normally and so that the instrumentation of the build process is transparent from the perspective of the build system 130.

Figure 2:
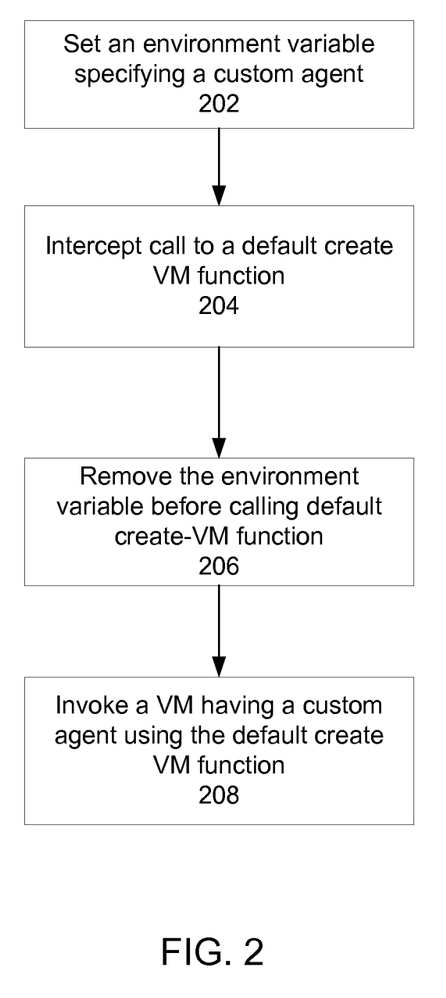
FIG. 2 is a flow diagram of an example method for cleansing a build environment using a custom create-VM function.

FIG. 2 is a flow diagram of an example method for cleansing a build environment using a custom create VM function. The process will be described as being performed by an appropriately programmed system of one or more computers.

The system sets an environment variable specifying a custom agent (202). In some build system environments, e.g., build systems for Java, an environment variable can specify a custom agent that should be loaded. For example, the environment variable can specify the location of a Java Archive (JAR) file containing a custom java agent. The custom agent replaces or extends the functionality of a given set of methods whenever those methods are invoked.

The system intercepts calls to the default create VM function. (204). The system can use any appropriate technique for preempting calls to a default create VM function, e.g., overloading or overriding the default create VM function.

In some implementations, the system uses a custom symbol lookup function to preempt the default create VM function. This is described in more detail below with reference to FIG. 3.

The custom create VM function removes the environment variable from the execution environment before calling the default create VM function (206). In other words, the custom create VM function removes environment variables that may cause a build system to emit a warning or an error message that can cause the build to fail, e.g., JAVA_TOOL_OPTIONS. Generally these are environment variables that have been set by the static analysis system. In other words, to maintain transparency when instrumenting the build system, the system typically does not modify environment variables that are relied upon or set by the build system itself.

The custom create VM function invokes a VM having a custom agent using the default create VM function (208). In some implementations, the custom create VM function specifies the custom agent by an argument rather than by the removed environment variable. For example, the custom create VM function can append an argument specifying the custom agent to an argument list for the default create VM function.

By invoking the VM having the custom agent in the cleansed build environment, the system can transparently instrument the build process and thereby gain access to source code that is built by the build system. Thus, the custom agent can, for example, receive all the command line arguments that would have been passed to the default compile functions of the build system, e.g., command line arguments that specify locations of source code files. The custom agent can then access the source code files and extract the source code from the source code files.

After the custom create VM function invokes the VM having the custom agent, the system can restore the execution environment by resetting the environment variable that specifies the custom agent, e.g., JAVA_TOOL_OPTIONS.

Restoring the JAVA_TOOL_OPTIONS environment variable provides a level of robustness in the build system instrumentation. For example, if the interception of the default create VM function should fail for future process invocations, e.g., if the build system is a distributed system having machines on which the interception library cannot be installed, the build instrument simply falls back to using JAVA_TOOL_OPTIONS to specify a custom agent with which to extract source code on those machines.

The following example segment of pseudo code illustrates a custom create VM function for Java:

```
JNI_CreateJavaVM(x, y, argv) {
    //split all JAVA_TOOL_OPTIONS args by whitespace
    let JTO=split(getenv("JAVA_TOOL_OPTIONS"))
    //get all custom agent arguments
    let custom_agent_args=filter JTO (\arg→arg contains cus-
        tom-agent.jar)
    //Get all other arguments
    let other_args=filter JTO (\arg→not arg contains custom-
        agent.jar)
    //Reset environment to omit the custom agent
        variable setenv("JAVA_TOOL_OPTIONS", combine
        other_args)
    //Call the default create VM function with
    //custom agent arguments appended to argument list
    let result=dlsym(RTLD_Next, "JNI_CreateJavaVM")(x,
        y, argv++custom_agent_args)
    //Restore the execution environment
    setenv("JAVA_TOOL_OPTIONS", combine JTO)
    return result
}
```

Figure 3:
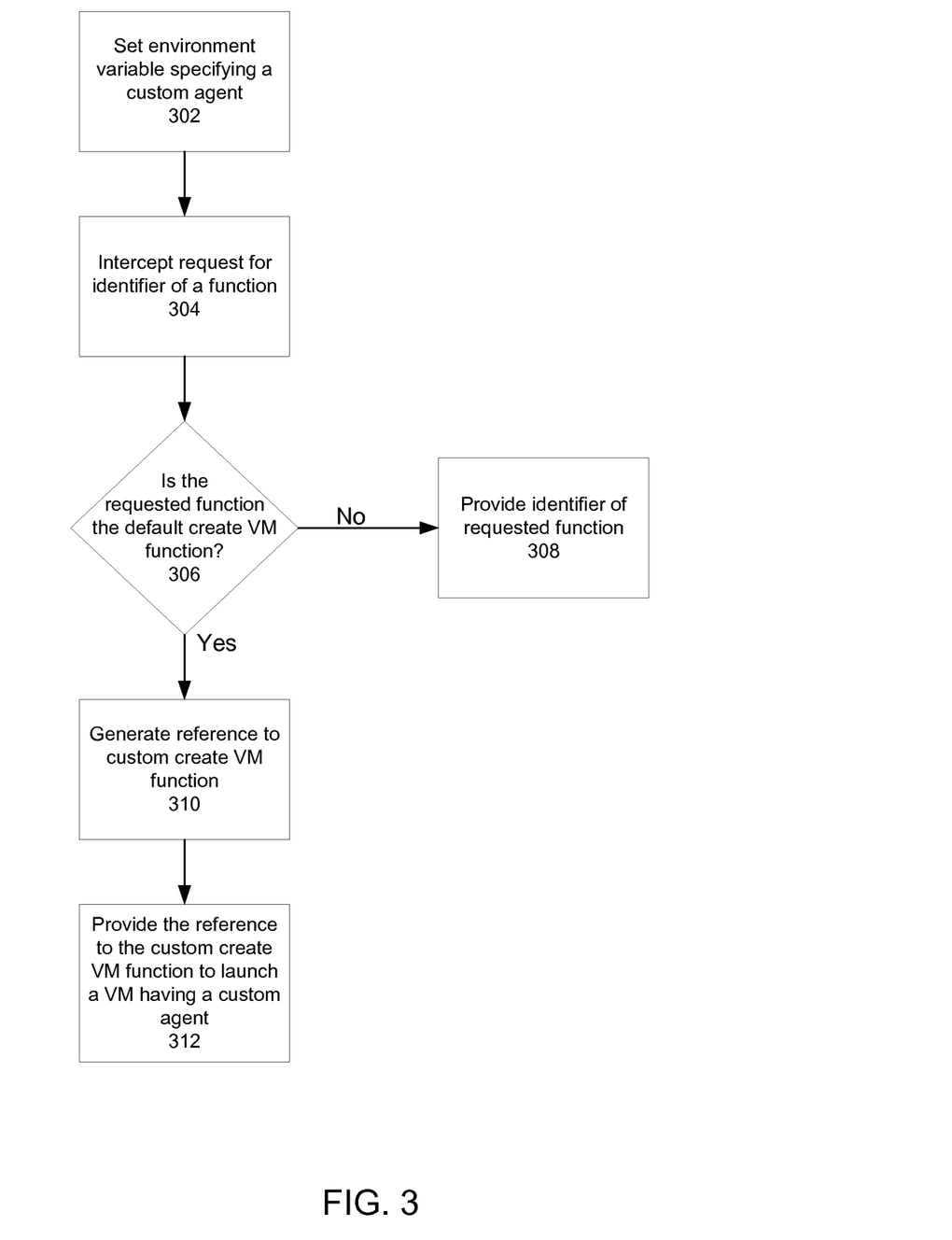
FIG. 3 is a flow diagram of an example method for cleansing a build environment using a custom symbol lookup function.

FIG. 3 is a flow diagram of an example method for cleansing a build environment using a custom symbol lookup function. The process will be described as being performed by an appropriately programmed system of one or more computers.

The system sets an environment variable that, when encountered by a default create VM function, causes the default create VM function to load a custom agent specified by the environment variable (step 302). The environment variable can be a "-javaagent" argument set in a JAVA_TOOL_OPTIONS environment variable set in an execution environment, as described above with reference to FIG. 1.

The system intercepts, by a custom symbol lookup function, a request by the build system for an identifier of a function (step 304). For example, the custom symbol lookup function can overload the default symbol lookup function. This causes the custom symbol lookup function to execute instead of the default symbol lookup function when the system calls the default symbol lookup function.

The system determines whether the requested function is the default create VM function (step 306). That is, the custom symbol lookup function can determine whether the string argument identifies the default create VM function.

If the requested function is not the default create VM function, the system can merely provide an identifier of the requested function (branch to 308). For example, the system can use the default symbol lookup function to find the requested function. The custom symbol lookup function can then provide the requested function to the requesting process.

Some symbol-lookup functions, including dlsym, determine which library in which to search by examining the function call stack. For example, if dlsym is called with an argument "RTLD_NEXT," dlsym searches for the requested function in the shared object after the current shared object.

But because dlsym has been intercepted by a custom dlsym, the system needs to maintain the call stack to ensure proper operation of dlsym. To do so, the system can jump to the default dlsym instead of calling the default dlsym. The following example pseudo code illustrates an example custom dlsym that jumps to the default dlsym:

```
dlsym(lib, name) {
  if lib==RTLD_NEXT:
  //*jump* to the default symbol lookup function (dlsym)
  //so the call stack is not changed
  //as it would be with a function call.
  jump get_original_dlsym( )
  else
  jump dlsym_replacement
}
```

The following example code illustrates an implementation of the function "get_original_dlsym( )," which simply returns the location of the default symbol lookup function:

```
get_original_dlsym( ) {
  return_libc_dlsym(libc, "dlsym")
}
```

If the requested function is the default create VM function, the custom symbol lookup function generates a reference to a custom create VM function (branch to 310). For example, the custom symbol lookup function can return an address at which the custom create VM function is loaded in memory.

Alternatively, the custom symbol lookup function can return a function closure that defines the custom create VM function. The custom create VM function, when executed, causes the build system to launch a VM having a custom agent without the execution environment having the environment variable being set.

The system then provides the reference to the custom create VM function (312). Providing the reference to the custom create VM function thus causes the build system to launch a VM having a custom agent without the execution environment having the environment variable being set.

As discussed above with reference to FIG. 2, the custom create VM function can remove the environment variable from the execution environment and specify the custom agent in another way, e.g., by specifying the custom agent a list of arguments to the default create VM function.

The following is an example segment of pseudo code for a custom symbol lookup function to return a function closure for a custom create VM function if the requested identifier is for the default create VM function.

```
dlsym_replacement(lib, name) {
  //Use_libc_dlsym to get default symbol lookup function
  //(dlsym)
  //and then call_libc_dlsym, passing the lib and name
  //arguments
  let orig_dlsym=get_original_dlsym( )
  let f=orig_dlsym(lib, name)
  //Only intercept calls to a custom create-process
  //function
  if f!=null && name=="JNI_CreateJavaVM" then
    return function(x, y, argv) {
      let JTO=split(getenv("JAVA_TOOL_OPTIONS"))
      let custom_agent_args=filter JTO (\arg→arg contains custom-agent.jar)
      let other_args=filter JTO (\arg→not arg contains custom-agent.jar)
      setenv("JAVA_TOOL_OPTIONS", combine other_args)
      //f is the default symbol lookup function (dlsym)
      result=f(x, y, argv++custom_agent_args)
      setenv("JAVA_TOOL_OPTIONS", combine JTO)
      return result
    }
  else
    return f
}
```

As described above, the VM being launched with the custom agent will result in the custom agent intercepting calls to compile functions. Thus, the custom agent can gain access to the source code that is compiled by a compiler of the build system.

After the custom create VM function invokes the VM having the custom agent, the system can then restore the execution environment by adding the environment variable back to the execution environment.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments of the attached embodiments and the embodiments described above, the following embodiments are also innovative:

Embodiment 1 is a method comprising:

setting, in an execution environment of a computer system, a first environment variable that specifies a custom agent to be executed in the execution environment;

intercepting, by a custom create VM function, a request by the system to create a virtual machine using a default create VM function;

removing, by the custom create VM function, the first environment variable from the execution environment; and executing, by the custom create VM function, the default create VM function to invoke a VM having the custom agent without the execution environment having the first environment variable being set.

Embodiment 2 is the method of embodiment 1, wherein executing the default create VM function comprises executing the default create VM function with the custom agent specified as an argument to the default create VM function.

Embodiment 3 is the method of embodiment 1, further comprising attaching the custom agent to the VM after the VM has been invoked.

Embodiment 4 is the method of any one of embodiments 1-3, further comprising:

receiving, by the custom agent, an identification of one or more source code files; and extracting, by the custom agent, source code of the one or more source code files.

Embodiment 5 is the method of any one of embodiments 1-4, wherein the system generates diagnostic messages whenever the default create VM function is called with the first environment variable being set.

Embodiment 6 is the method of any one of embodiments 1-5, wherein the default create VM function is a Java create VM function.

Embodiment 7 is the method of any one of embodiments 1-6, further comprising resetting, by the custom create VM function, the first environment variable in the execution environment after the default create VM function has been called.

Embodiment 8 is a method comprising:

setting, in an execution environment of a computer system, a first environment variable that specifies a custom agent to be executed in the execution environment;

intercepting, by a custom symbol lookup function, a request by the system to a default symbol lookup function to return an identifier of a particular function;

determining, by the custom symbol lookup function, that the particular function is a default create VM function;

in response to the determining, generating, by the custom symbol lookup function, a reference to a custom create VM function, wherein the custom create VM function removes the first environment variable from the execution environment before executing the default create VM function to invoke a VM having the custom agent; and providing, by the custom symbol lookup function, the reference to the custom create VM function in response to the request, thereby causing a build system to launch the VM having the custom agent without the execution environment having the first environment variable being set.

Embodiment 9 is the method of embodiment 8, wherein executing the default create VM function comprises executing the default create VM function with the custom agent specified as an argument to the default create VM function.

Embodiment 10 is the method of embodiment 8, further comprising attaching the custom agent to the VM after the VM has been invoked.

Embodiment 11 is the method of any one of embodiments 8-10, further comprising:

receiving, by the custom agent, an identification of one or more source code files; and extracting, by the custom agent, source code of the one or more source code files.

Embodiment 12 is the method of any one of embodiments 8-11, wherein the system generates a diagnostic message whenever the default create VM function is called with the first environment variable being set.

Embodiment 13 is the method of any one of embodiments 8-12, wherein the default create VM function is a Java default create VM function.

Embodiment 14 is the method of any one of embodiments 8-13, wherein intercepting the request comprises overloading the default symbol lookup function with the custom symbol lookup function.

Embodiment 15 is the method of any one of embodiments claim 8-14, further comprising resetting the first environment variable in the execution environment after the default create VM function is called.

Embodiment 16 is a system comprising: one or more computers and one or more storage devices storing instructions that are operable, when executed by the one or more computers, to cause the one or more computers to perform the method of any one of embodiments 1 to 15.

Embodiment 17 is a computer storage medium encoded with a computer program, the program comprising instructions that are operable, when executed by data processing apparatus, to cause the data processing apparatus to perform the method of any one of embodiments 1 to 15.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

setting, in an execution environment of a computer system, a first environment variable that specifies a custom agent to be executed in the execution environment;

intercepting, by a custom create VM function, a request by the system to create a virtual machine using a default create VM function;

removing, by the custom create VM function, the first environment variable from the execution environment; and executing, by the custom create VM function, the default create VM function to invoke a VM having the custom agent without the execution environment having the first environment variable being set.

2. The method of claim 1, wherein executing the default create VM function comprises executing the default create VM function with the custom agent specified as an argument to the default create VM function.

3. The method of claim 1, further comprising attaching the custom agent to the VM after the VM has been invoked.

4. The method of claim 1, further comprising:

receiving, by the custom agent, an identification of one or more source code files; and extracting, by the custom agent, source code of the one or more source code files.

5. The method of claim 1, wherein the system generates diagnostic messages whenever the default create VM function is called with the first environment variable being set.

6. The method of claim 1, wherein the default create VM function is a Java create VM function.

7. The method of claim 1, further comprising resetting, by the custom create VM function, the first environment variable in the execution environment after the default create VM function has been called.

8. A computer-implemented method comprising:
setting, in an execution environment of a computer system, a first environment variable that specifies a custom agent to be executed in the execution environment;
intercepting, by a custom symbol lookup function, a request by the system to a default symbol lookup function to return an identifier of a particular function;
determining, by the custom symbol lookup function, that the particular function is a default create VM function;
in response to the determining, generating, by the custom symbol lookup function, a reference to a custom create VM function, wherein the custom create VM function removes the first environment variable from the execution environment before executing the default create VM function to invoke a VM having the custom agent; and
providing, by the custom symbol lookup function, the reference to the custom create VM function in response to the request, thereby causing a build system to launch the VM having the custom agent without the execution environment having the first environment variable being set.

9. The method of claim 8, wherein executing the default create VM function comprises executing the default create VM function with the custom agent specified as an argument to the default create VM function.

10. The method of claim 8, further comprising attaching the custom agent to the VM after the VM has been invoked.

11. The method of claim 8, further comprising:
receiving, by the custom agent, an identification of one or more source code files; and
extracting, by the custom agent, source code of the one or more source code files.

12. The method of claim 8, wherein the system generates a diagnostic message whenever the default create VM function is called with the first environment variable being set.

13. The method of claim 8, wherein the default create VM function is a Java default create VM function.

14. The method of claim 8, wherein intercepting the request comprises overloading the default symbol lookup function with the custom symbol lookup function.

15. The method of claim 8, further comprising resetting the first environment variable in the execution environment after the default create VM function is called.

16. A system comprising:
one or more computers and one or more non-transitory computer storage media storing instructions that are operable, when executed by the one or more computers, to cause the one or more computers to perform operations comprising:
setting, in an execution environment of a computer system, a first environment variable that specifies a custom agent to be executed in the execution environment;
intercepting, by a custom create VM function, a request by the system to create a virtual machine using a default create VM function;
removing, by the custom create VM function, the first environment variable from the execution environment; and
executing, by the custom create VM function, the default create VM function to invoke a VM having the custom agent without the execution environment having the first environment variable being set.

17. The system of claim 16, wherein executing the default create VM function comprises executing the default create VM function with the custom agent specified as an argument to the default create VM function.

18. The system of claim 16, wherein the operations further comprise attaching the custom agent to the VM after the VM has been invoked.

19. The system of claim 16, wherein the operations further comprise:
receiving, by the custom agent, an identification of one or more source code files; and
extracting, by the custom agent, source code of the one or more source code files.

20. The system of claim 16, wherein the system generates diagnostic messages whenever the default create VM function is called with the first environment variable being set.

21. The system of claim 16, wherein the default create VM function is a Java create VM function.

22. The system of claim 16, wherein the operations further comprise resetting, by the custom create VM function, the first environment variable in the execution environment after the default create VM function has been called.

23. A system comprising:
one or more computers and one or more non-transitory computer storage media storing instructions that are operable, when executed by the one or more computers, to cause the one or more computers to perform operations comprising:
setting, in an execution environment of a computer system, a first environment variable that specifies a custom agent to be executed in the execution environment;
intercepting, by a custom symbol lookup function, a request by the system to a default symbol lookup function to return an identifier of a particular function;
determining, by the custom symbol lookup function, that the particular function is a default create VM function;
in response to the determining, generating, by the custom symbol lookup function, a reference to a custom create VM function, wherein the custom create VM function removes the first environment variable from the execution environment before executing the default create VM function to invoke a VM having the custom agent; and
providing, by the custom symbol lookup function, the reference to the custom create VM function in response to the request, thereby causing a build system to launch the VM having the custom agent without the execution environment having the first environment variable being set.

24. The system of claim 23, wherein executing the default create VM function comprises executing the default create VM function with the custom agent specified as an argument to the default create VM function.

25. The system of claim 23, wherein the operations further comprise attaching the custom agent to the VM after the VM has been invoked.

26. The system of claim 23, wherein the operations further comprise:
receiving, by the custom agent, an identification of one or more source code files; and extracting, by the custom agent, source code of the one or more source code files.

27. The system of claim 23, wherein the system generates a diagnostic message whenever the default create VM function is called with the first environment variable being set.

28. The system of claim 23, wherein the default create VM function is a Java default create VM function.

29. The system of claim 23, wherein intercepting the request comprises overloading the default symbol lookup function with the custom symbol lookup function.

30. The system of claim 23, wherein the operations further comprise resetting the first environment variable in the execution environment after the default create VM function is called.

\* \* \* \* \*